UNITED STATES PATENT OFFICE.

WILHELM HERZBERG AND OSWALD SCHARFENBERG, OF SCHÖNEBERG, NEAR BERLIN, GERMANY, ASSIGNORS TO ACTIEN GESELLSCHAFT FÜR ANILIN FABRIKATION, OF BERLIN, GERMANY.

MONOAZO DYE FOR WOOL.

986,287.  Specification of Letters Patent.  Patented Mar. 7, 1911.

No Drawing.   Application filed November 14, 1910.  Serial No. 592,331.

*To all whom it may concern:*

Be it known that we, WILHELM HERZBERG and OSWALD SCHARFENBERG, citizens of the German Empire, residing at and whose post-office addresses are, respectively, Landshuterstrasse 24 and Wartburgstrasse 8, Schöneberg, near Berlin, Germany, have invented a New Monoazo Dye for Wool, of which the following is a specification.

Our present invention relates to a new monoazo-dye for wool and especially adapted to a subsequent treatment with oxidizing chromium compounds, which can be obtained by diazotizing the urea derivative of the following formula:

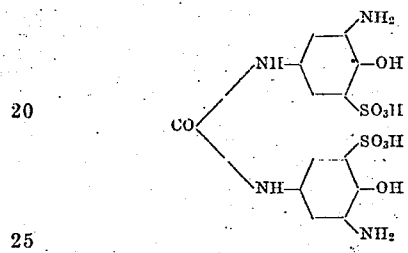

which derivative may be obtained for instance by acting with phosgen: $COCl_2$ upon 1.4-amidophenol-2-nitro-6-sulfonic acid and reducing the condensation product, and combining the resulting tetrazo compound with beta-naphthol. The dye thus obtained produces on wool from an acid bath brownish red tints which by a subsequent treatment with potassium bichromate change to a black violet possessing a great fastness to milling and potting besides an excellent fastness against the action of light.

The following example serves to illustrate our invention the parts being by weight: 43.5 parts of the urea derivative of the above-given formula are tetrazotized in the usual manner by means of hydrochloric acid and sodium nitrite. The tetrazo solution thus obtained is allowed to run while stirring into a solution of 29 parts of beta-naphthol containing the calculated proportion of caustic soda lye and such a quantity of sodium carbonate as to guarantee alkaline reaction throughout the whole combination. The reaction being finished the mass is warmed up, whereupon the dye is precipitated by the addition of common salt and isolated in the usual manner.

The new product dyes wool from an acid bath brownish red tints which on subsequent treatment with potassium bichromate change to black-violet. The new dye in the dry state when pulverized forms a dark powder having a bronze-like luster; it dissolves in water to a violet solution which on the addition of concentrated soda-lye turns to a claret color, the dye being separated to a great deal in claret flakes, and on the addition of concentrated hydrochloric acid separates a brown precipitate; concentrated liquor ammonia changes the color of the aqueous solution to claret. The new product is insoluble in alcohol; it dissolves in concentrated sulfuric acid to a red violet solution which solution on the addition of ice shows a brown precipitate. By the action of strong reducing agents, such as for instance stannous chlorid and hydrochloric acid, the new coloring matter is split up, the urea derivative which serves as parent material for the production of the dye being regenerated and 1-amido-2-naphthol being simultaneously formed.

It is obvious that our present invention is not limited to the foregoing example or to the details given therein.

Having now described our invention and the manner in which it may be carried out what we claim is,—

As a new article of manufacture the new monoazo dye for wool, which may be obtained by tetrazotizing the urea derivative of the following formula:

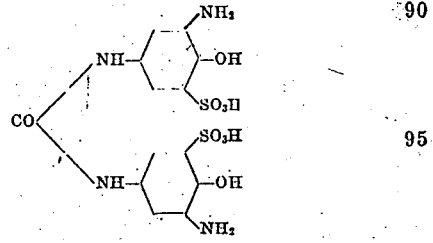

and combining the tetrazo compound thus obtained with beta-naphthol, which new dye in the shape of the sodium salt in the dry state when pulverized forms a dark powder having a bronze-like luster and dissolves in water to a violet solution which solution on the addition of concentrated soda-lye assumes a claret color, the dye being separated in a great deal in claret flakes and on the addition of concentrated hydrochloric acid separates a brown precipitate and on the addition of concentrated liquor ammonia turns to a claret solution, and this new dye being insoluble in alcohol, but soluble in concentrated sulfuric acid to a red, violet solution which solution on the addition of ice shows a brown precipitate, whereas the new coloring matter by the action of strong reducing agents, stannous chlorid and hydrochloric acid, is split up, the urea derivative which serves as parent material for the production of the dye being regenerated and 1-amido-2-naphthol being simultaneously formed, which new dye produces on wool from an acid bath brownish-red tints which on subsequent treatment with potassium bichromate change to a black-violet which is very fast to milling and potting and possesses an excellent fastness against the action of light.

In testimony whereof we have hereunto set our hands in presence of two subscribing witnesses.

WILHELM HERZBERG.
OSWALD SCHARFENBERG.

Witnesses:
 HENRY HASPER,
 WOLDEMAR HAUPT.